Dec. 23, 1952        M. P. HAINES        2,622,331
SNAP GAUGE
Filed July 19, 1950
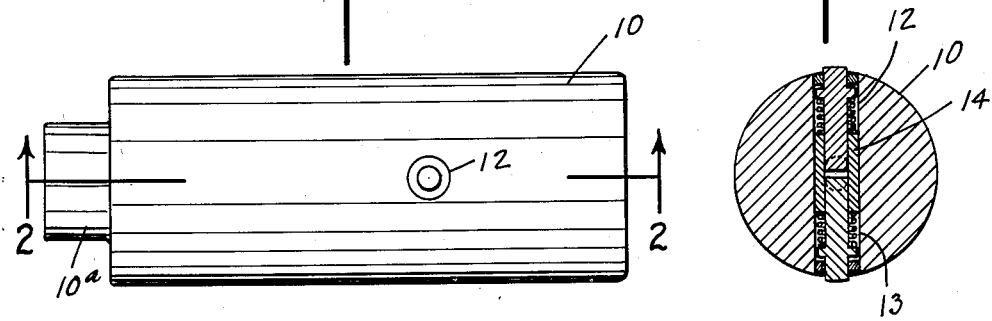
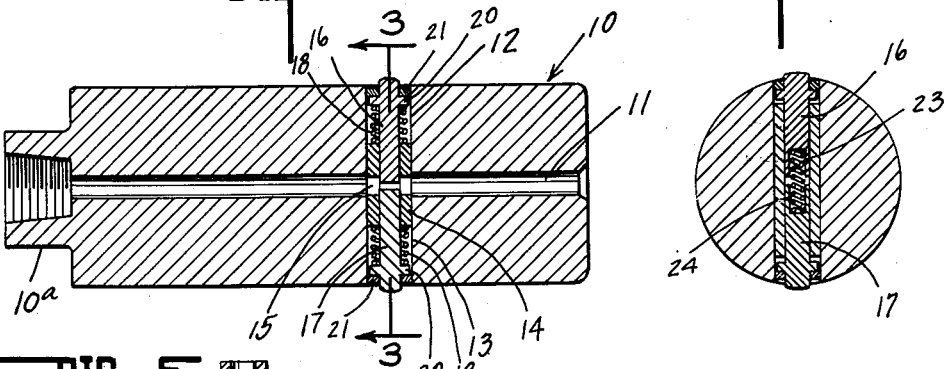
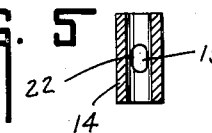
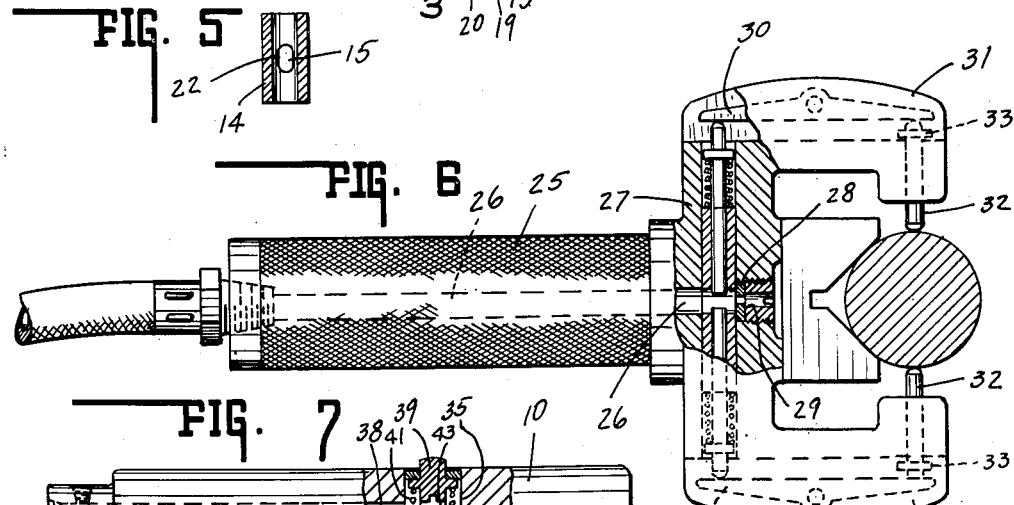
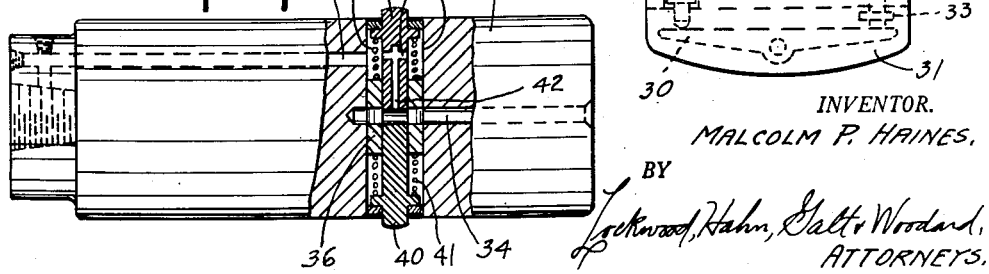
INVENTOR.
MALCOLM P. HAINES,
BY
Lockwood, Hahn, Galt & Woodard,
ATTORNEYS.

Patented Dec. 23, 1952

2,622,331

UNITED STATES PATENT OFFICE 2,622,331

SNAP GAUGE

Malcolm P. Haines, Indianapolis, Ind., assignor to The Sheffield Corporation, Dayton, Ohio, a corporation of Ohio Application July 19, 1950, Serial No. 174,615

3 Claims. (Cl. 33—143)

The present invention relates to improvements in gauging apparatus and particularly air snap gauges.

More particularly my invention relates to improvements in that type of snap or plug gauge adapted to cooperate with gauging apparatus wherein the passage of fluid under pressure is controlled by the gauge member and which passage is adapted to operate or control a suitable indicator.

It is one of the objects of my invention to provide a snap or plug gauge structure for measuring, particularly the inside diameter of circular bores or the outside diameter of cylindrical structures.

More specifically it is one of the objects of my invention to provide a gauge structure which will accurately control the passage of fluid under pressure irrespective of the fact that more pressure may be exerted on one side of the gauge structure or the gauge structure may be deflected from absolute alignment in the bore of the structure to be measured.

For the purpose of illustration I have shown certain embodiments of the invention in the accompanying drawings in which:

Fig. 1 is a side elevation of a gauge member for measuring inside diameters of bores.

Fig. 2 is a longitudinal sectional view of the structure illustrated in Fig. 1.

Fig. 3 is a transverse sectional view taken on the line 3—3 of Fig. 2.

Fig. 4 is a transverse sectional view of a modification of the structure illustrated in Fig. 3.

Fig. 5 is a detailed sectional view showing particularly the shape of the escape opening of the gauge.

Fig. 6 is a side elevation of a modification of my gauge for use in measuring outside diameters; and Fig. 7 is a longitudinal sectional view of a modification of the structure shown in Fig. 1.

In the structure illustrated in Figs. 1, 2 and 3 I provide a cylindrical plug or body member 10 having an axial passage 11 extending from end to end thereof. At one end of the plug a hose receiving flange 10a surrounding the passage is provided with for attachment to the plug of a suitable fluid conveying hose. Intersecting the axial passage 11 are radial passages 12 and 13 which extend from the bore 11 to the outer periphery of the plug 10. Within these passages 12 and 13 is mounted a guide sleeve 14 in which is guided radially moveable valve stems 16 and 17. The walls of this sleeve are provided with openings 15 which coincide with the passages 11. The side walls of these openings are flattened to provide a substantially rectangular opening having a rounded top and bottom. These valve stems in effect constitute valve members controlling the extent of opening of the openings 15. The valve stems are biased in their open position or in radially outward direction through the medium of coiled springs 18 and 19, respectively interposed between the outer ends of the guide sleeve 14 and annular flanges 20 at the outer ends of the stem. The valve stems are restrained from moving out of the passages 12 and 13 through the medium of the annular flanges 20 which abut against restraining discs 21 in each passage which disc is fixed in the passage preferably by having a press fit therein. The discs have central openings which accommodate that portion of the valve stems extending above the flanges 20.

The side walls of the openings 15 are flattened as at 22 so that the rate of flow will be constant, see Fig. 5.

In Fig. 4, I have illustrated a modification of my invention wherein the sleeve is elongated and instead of a pair of biasing springs as is illustrated in Figs. 2 and 3 a single biasing spring 23 is interposed between the opposite ends of the valve stems 16 and 17, which seats into central bores such as 24 in the valve stems.

In Fig. 6 I have illustrated a modified structure which may be used for measuring the outside diameter of structures. In this structure a handle 25 is provided, having an axial passage 26 therein. This axial passage enters the back member 27 of a caliper like structure, and is continued through this structure to the front.

At this point the bore is enlarged to receive a disc 28 having a central aperture and held in place by an aperture plug 29. The valve structure is the same as that shown in Fig. 2. The outer ends of the valves engage levers 30 pivoted in the arms 31. The free ends of the levers have inwardly projecting pins 32. These pins have flanges 33 which restrict their inward movement.

In the structure illustrated in Fig. 7 the body member 10 is provided with an inlet passage 38 which while being parallel to the axis of the body member is offset from said axis. This passage enters a radial passage or bore 35 in which is arranged a sleeve 36 similar to the sleeve 14. The sleeve 36 has an outlet opening, communicating with an axial passage 34 in the body 10. Operating in this sleeve is a pair of valves 39 and 40 biased outwardly by springs 41 similar to the spring 18. The valve 39 has an axial passage 42 which communicates through a radial passage 43 with the bore 35. Therefore as the air enters the passage 38 it will pass by the way of passages 42 and 43 to the face of the valve member 39. This face cooperates with the face to the valve member 40 to control the passage of the air between the valve member and out through the passage 34.

I claim as my invention:

1. In a gauge of the character described, in combination, a body member having an axial passage extending therethrough and two oppositely disposed radially extending aligned bores therein, a sleeve fitting within both said bores and having openings in the wall thereof coinciding with said passage, radially slideable valve members operating in said sleeve, said members each terminating at its inner end in a flat transverse surface, the inner ends of the two members being spaced apart and controlling the extent of the opening of the openings in said sleeve and means for biasing said valve members radially outwardly in opposite directions.

2. In a gauge of the character described, in combination, a body member having an axial passage extending therethrough and two oppositely disposed radially extending aligned bores therein, a sleeve fitting within both said bores and having openings in the wall thereof coinciding with said passage, radially slideable valve members operating in said sleeve, the inner ends of said valve members controlling the extent of opening of the openings in said sleeve, spring means biasing said valve members radially outwardly in opposite direction, a restraining disc in the outer ends of said bores having openings to accommodate the outer end of each said valve member, an annular shoulder on each of said valve members inwardly spaced from the outer ends thereof and adapted to abut against the restraining discs.

3. In a gauge of the character described the combination as set forth in claim 1 in which the radially slideable valve members are both of similar form and size and in which the biasing means comprise a helical spring interposed between the sleeve and an outer portion of each of said valve members.

MALCOLM P. HAINES.

REFERENCES CITED

The following references are of record in the file of this patent:

UNITED STATES PATENTS

| Number | Name | Date |
| --- | --- | --- |
| 1,676,248 | Bryant | July 10, 1928 |
| 1,954,442 | Dall | Apr. 10, 1934 |
| 2,369,319 | Smith | Feb. 13, 1945 |
| 2,375,600 | Wattebot | May 8, 1945 |
| 2,490,376 | Rupley | Dec. 6, 1949 |